Aug. 11, 1970        T. F. HEWINS        3,523,834
METHOD OF DEBURRING
Filed Oct. 13, 1967
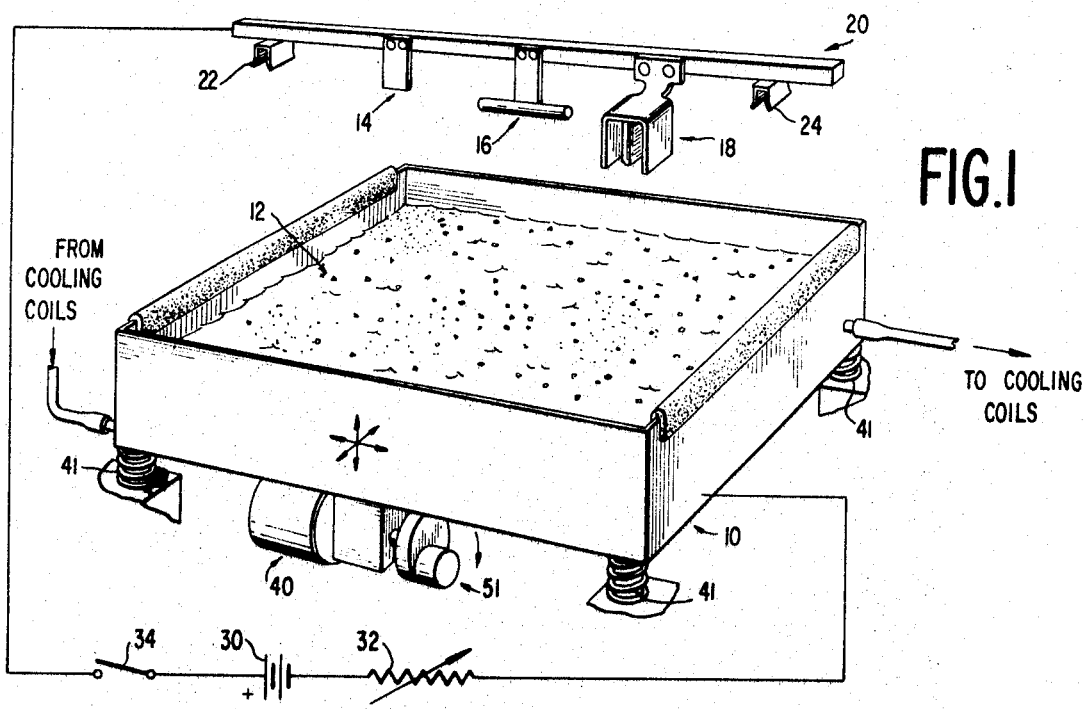
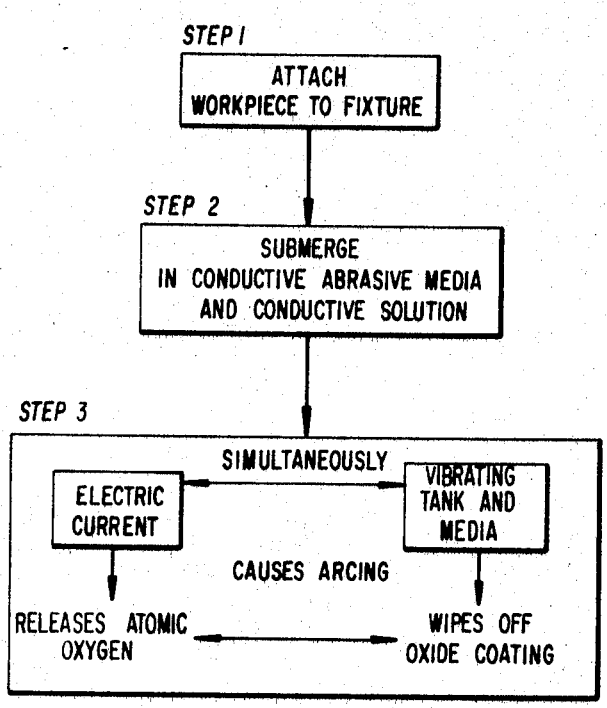
FIG.3
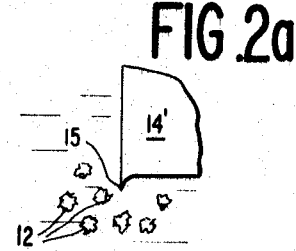
FIG.2a
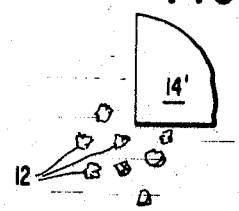
FIG.2b
INVENTOR
THOMAS F. HEWINS
BY *Theodore E. Galanthay*
AGENT

United States Patent Office 3,523,834
Patented Aug. 11, 1970

3,523,834
METHOD OF DEBURRING
Thomas F. Hewins, Lexington, Ky., assignor to International Business Machines Corporation, Armonk, N.Y., a corporation of New York
Filed Oct. 13, 1967, Ser. No. 675,211
Int. Cl. B23p 1/00; C23f 7/10
U.S. Cl. 148—6.15                         9 Claims

ABSTRACT OF THE DISCLOSURE

The removing of burrs and other small imperfections from conductive workpieces by a combination of mechanical, electrical, and chemical processes consisting of a vibratable container having therein a conductive abrasive media immersed in a conductive solution. The workpieces are submerged in said conductive abrasive media and conductive solution and an electric current is passed through the workpieces, simultaneously with vibrating the container. The conductive abrasive media immersed in the conductive solution provides automatic current regulation for any given supply voltage.

BACKGROUND OF THE INVENTION

My invention relates to a method and means for deburring metallic workpieces. More specifically, my invention relates to removing burrs from workpieces by means of simultaneously subjecting the workpieces to several deburring forces.

Briefly, machined metal normally has various imperfections thereon. For example, after a cutting operation, a workpiece has small sharp portions, called burrs protruding from it. Prior art methods for deburring include: reciprocating or vibrating a workpiece in a tank containing abrasive media, subjecting a workpiece to abrasive grinding or blasting, and chemical erosion or deplating. These techniques have been relatively inefficient and costly, and entirely unacceptable for small electronic components which frequently become damaged when subjected to some of the deburring processes presently known in the art. Even larger workpieces frequently receive rounded edges and other undesirable characteristics from presently known deburring processes.

SUMMARY OF THE INVENTION

Accordingly, it is an object of my invention to provide a faster and more efficient method and means for deburring workpieces.

A further object of my invention is to remove burrs by subjecting workpieces simultaneously to: mechanical vibration and abrasion, an electric current, and chemical action.

A specific object of this invention is to provide a method of removing burrs which will not damage the workpieces.

A still more specific object of this invention is to remove burrs by taking advantage of the oxidizing characteristics of atomic oxygen.

The apparatus of this invention includes a container having conductive abrasive media immersed in a conductive solution, in which the workpieces to be deburred are submerged. The workpieces are attached to a conductive fixture so that an electric current can be passed through them to the conductive abrasive media and conductive solution. Also, the container has means for being vibrated. The method of deburring according to my invention includes the steps of submerging a workpiece in a container having the conductive abrasive media and conductive solution therein and then passing an electric current through said workpiece and said conductive abrasive media and solution, and simultaneously vibrating said container. My technique of subjecting a workpiece to the combination of: mechanical vibrating with conductive random size abrasive media in a conductive solution, and the simultaneous passing of an electric current, has resulted in much faster deburring than known heretofore, with a cycle controlled so that no rounded edges or other damage to the workpiece results. My invention further provides for an inherent regulation of the current by the particular size and gradation of the conductive abrasive media immersed in the conductive solution, for any given value of supply voltage. My method and means is particularly advantageous for small electronic components and mass produced components.

The foregoing and other objects, features and advantages of my invention will be apparent from the following and more particular description of preferred embodiments of the invention, as illustrated in the accompanying drawings.

BRIEF DESCRIPTION OF THE DRAWINGS

FIG. 1 is a perspective view of the apparatus of my invention.

FIGS. 2a and 2b are close-up views showing the action of the conductive abrasive media on a workpiece that is to be deburred and the same workpiece after burr removal.

FIG. 3 shows in schematic form the preferred method steps of this invention.

DESCRIPTION OF THE PREFERRED EMBODIMENTS

Referring now generally to the drawings and more particularly to FIG. 1, a preferred embodiment of the apparatus of my invention is shown. Container 10 is shown partially filled with conductive abrasive media 12 immersed in conductive solution. Container 10 can conveniently be made of steel for example, and attached to the negative pole of a source of DC current. The conductive abrasive media 12 is reconstituted silicon carbide. As an alternative, the reconstituted silicon carbide can be replaced by a non-conductive abrasive in a conductive binder. For example, copper binder can be used with aluminum oxide as the abrasive. For the conductive solution, I prefer to use a phosphoric acid solution. A 25% concentration by volume has been found to provide good results. Other ionizing solutions can also be used. Workpieces 14, 16 and 18 are attached to a conductive fixture by some convenient means such as screws, for example. The workpieces are then submerged in the conductive abrasive media and conductive solution and supported by means of the fixture. It is important that conductive fixture 20 be electrically insulated from the negative terminal, which in the example shown is tank 10. Fixture 20 can be attached to the edge of tank 10, by means of clips 22 and 24, but these clips must be of a non-conductive material to insulate fixture 20 from tank 10. As an alternative, an insulating material can be used on the edge of tank 10 as shown in FIG. 1.

Battery 30 is shown as the source of electric potential for establishing a current through the workpiece, conductive abrasive media, and solution. A relatively low voltage such as 12 volts for example, is enough to provide a current density of 4–5 amps per square inch, because the use of conductive media 12 in an ionized solution results in relatively low resistance in the circuit. Variable resistor 32 regulates the current in the circuit, while switch 34 operates as an ON/OFF switch. In the embodiment shown, direct current (DC) is indicated, but alternating current (AC) also produces the required result. With alternating current, however, container 10 cannot be used as one of the electrodes, but rather a separate negative electrode must be placed in the conductive abrasive media and solution. Otherwise, portions of container 10 would be attacked by the electro-chemical action during positive portions of the alternating current.

Means for imparting random oscillatory motion to container 10 have been indicated by arrows. Many well known means for vibrating container 10 are known and commercially available. It is important that the vibrating of container 10 provides random contact between the conductive abrasive media 12 and the workpieces. One simple means of accomplishing this is to mount container 10 on springs 41 and impart motion to container 10 on the bottom by means of a rotating cam 51, as shown in FIG. 1. Many other types of mechanical vibrators as well as pneumatic and electrical devices will suggest themselves to those skilled in the art. As an added feature, cooling means such as a screened drain in container 10 can be provided so that the conductive solution can be continuously pumped from container 10 through cooling coils and then back into container 10. The requirements for cooling vary with the desired temperature of operation. The purpose of cooling the conductive solution is to maintain an optimum reaction temperature. See FIG. 1 where pipes are shown connecting container 10 to and from cooling coils.

IN OPERATION

In operation, according to my invention, I provide a steel tank 10 and partially fill it with conductive abrasive media 12, immersed in a conductive solution such as a 25% solution of phosphoric acid. As shown in FIG. 1, the workpieces 14, 16, 18 to be deburred are attached to a conductive fixture 20, and submerged in the conductive abrasive media and solution. Electric current is then passed through the workpieces and conductive abrasive media and solution. If direct current (DC) is used, the steel tank is made negative and the workpieces are made positive. Simultaneously with the passing of the electric current, the tank is vibrated, causing random contact between the workpieces 14, 16, 18 and the conductive abrasive media 12 in tank 10. The conductive abrasive media 12 preferably consists of reconstituted silicon carbide. Ordinary silicon carbide is not a very good conductor, but re-fusing with carbon makes it highly conductive. After re-fusing it is crushed to the desired grade. One source of reconstituted silicon carbide is commercially available "Glo-Bar" as manufactured by the Carborundum Corporation. This "Glo-Bar" can be crushed to a desired random particle size for use as a conductive abrasive media.

According to the method of my invention, a workpiece (e.g. 14) is submerged in the conductive abrasive media 12 and solution. An electric current is passed through the workpiece, and the conductive abrasive media 12 and solution. The conductive abrasive media 12 acts as an intensifier for current conduction by effectively bringing the electrodes right to the workpiece and thus greatly reducing the electrical gap between electrodes. The current intensity is approximately four to five amperes per square inch with approximately a 12 volt source, for example. Sometimes arcing results which burns off small burrs. An important feature of my method is that atomic oxygen is released on the surface of the workpiece which is at a positive potential. Since the workpiece will become most heated in the areas of highest resistance, the burrs which have a higher resistance than the remainder of the workpiece are heated to a correspondingly higher temperature and therefore the formation of oxides by the action of atomic oxygen is concentrated on the burrs. As the surface of the burr is oxidized, the oxide would normally remain as a protective and resistive layer, slowing down further oxidation and reducing current flow. My invention avoids this disadvantage by causing the workpiece and conductive abrasive media to be moved rapidly in relation to each other by means of vibrating the container as described above. This encourages further arcing between the conductive abrasive media 12 and burrs and also abrades loose burrs, and oxidized particles from the surface of the workpiece. It is therefore a very important result of vibrating the container that the oxide film formed by the atomic oxygen is continually wiped off the surface of the workpiece, thereby continually permitting new atomic oxygen to form and attack the burrs. Since the electro-chemical action increases with temperature, the most rapid oxidation is in the area of the burrs, as explained above. For this reason, my method rapidly removes burrs without effecting to the same extent the remainder of the workpiece. Since an important function of the conductive abrasive media 12 is to carry the electric current to the surface of the workpiece and remove newly formed oxide film, the media is not used primarily as an abrasive and therefore need not be replaced at frequent intervals. Therefore, satisfactory results are achieved even when the media is in the shape of round particles, providing very little abrasion, since the media still fufills its purpose of removing newly formed oxide film by a "squeegee" action; thereby continually providing a clean surface for the atomic oxygen to attack as it is released.

With reference to FIGS. 2a and 2b, a portion of a workpiece is shown before and after a deburring operation. FIG. 2a shows workpiece 14 having burr 15 protruding from it. Conductive abrasive media 12 are shown adjacent the burr. In practice, abrasive media 12 completely surround all the burrs. According to my method, a workpiece is attached to a conductive fixture, and the fixture is attached to a source of electric current. Next the workpiece is submerged in container 10 which has conductive abrasive media 12 immersed in the conductive solution. Switch 23 is closed and an electric current passes through the workpiece and the conductive abrasive media and solution releasing atomic oxygen on the surface of the workpiece. The atomic oxygen attacks the surface of the workpiece, particularly the burrs, thereby forming an oxide coating. As the oxide coating forms, it is continually wiped off the surface of the workpiece by the conductive abrasive media. This is accomplished by vibrating container 10, thus bringing the workpiece and the conductive abrasive media into random contact with each other. During this random contact, the electric current causes arcing between media 12 and the workpiece through the conductive solution. This tends to either burn burrs off completely, or if there is a large burr, it will tend to heat, causing an increased rate of oxidation. In this way, the oxidation of the burrs proceeds at a much more rapid rate than the oxidation of other portions of the workpiece. For this reason, burrs are removed without noticeable wear to other portions of the workpiece. The passing of the electric current and the vibrating of the container is continued until the burrs are removed from the workpiece. During the entire operation, the oxide film is continually removed from the surface of the burrs permitting atomic oxygen to be continually released on the surface of the burrs. The media also provides some abrasive action for removing loose burrs. Both direct current (DC) and alternating current (AC) provide satisfactory results. If DC is used, the container can be attached to the negative source of current and the fixture is attached to the positive source of current. The conductive abrasive media, being in intimate contact with the walls of the container, effectively become the negative electrodes while the workpiece being in electrical contact with the fixture becomes the positive electrode. The electrical gap through the conductive solution, is therefore always very small, thereby permitting the use of low voltage sources to provide the required current density.

Self-regulation of the current in the deburring circuit is obtained by selecting random size particles for the conductive abrasive media 12. Such a preselected batch of media 12 in combination with the conductive solution provides a desired range of resistivity. When container 10 is not vibrated, the variation in the resistance of the circuit depends solely on the random size, random contact, and percentage of the various sizes of particles. Such a batch of conductive abrasive media immersed in a conductive solution will have upper and lower limits in the levels of resistivity. The resistivity of the conductive solution is assumed to be constant. For this reason, for any given voltage the current will be within a known range. An actual desired current within such a range is then obtained by controlling the rate and amplitude of the vibrations of vibrating means 40. Thus, there is provided an inherent current regulating feature which simplifies the current controlling equipment required in conjunction with my invention. For any given volume of random sized conductive media, of known resistivity (resistivity measured in ohm per cubic cm.), there will exist an average "steady state" value of resistivity. Agitation of average force value will modify the "steady state" resistivity of this volume of random sized conductive media. However, the fact that the media is an electrical resistive substance will inherently limit the current flow according to Ohm's Law. An even further regulation of the current is provided by the cooling means which regulates the temperature of the conductive solution, the conductivity of the solution being a function of its temperature and its pH value.

The conductive solution can be phosphoric acid, as explained above. The workpiece is conductive and normally contains iron. This leads to an additional advantage in the method of my invention. After the burrs are removed from the workpiece, the current can be interrupted, the workpiece left in the conductive solution, for an interval, which in the example herein would cause an iron phosphate coating to form on the surface of the workpiece. This permits the workpiece to be washed in ordinary water without danger of corrosion and further protects the workpiece during dry storage.

My method has particular advantage when used in mass production for removing burrs from a great number of small electronic components. Referring back to FIG. 1, a plurality of fixtures 20 can be used. A plurality of workpieces can be attached to the fixture by any number of convenient means depending upon the size and shape of the workpieces. While some workpieces are being attached to a fixture, other workpieces are in the process of being deburred. Thus the operation is continuous with no loss of time.

In conclusion, a method and means has been disclosed for removing burrs from electrically conductive workpieces. An apparatus has been described having means for submerging a workpiece in a tank having conductive abrasive media immersed in a conductive solution. The tank is vibratable and means is provided for passing an electric current through the workpiece, the conductive abrasive media, and the conductive solution; thereby causing burrs on the workpiece to be heated, oxidized, and removed. A method has been described where a workpiece having burrs is subjected simultaneously to an electric current, which tends to burn off burrs through arcing and cause the release of atomic oxygen to form oxides, and means for continually removing the oxide film by the use of conductive abrasive particles which effectively bring the negative electrode directly to the workpiece, with the workpiece being the positive electrode.

While the invention has been particularly shown and described with reference to preferred apparatus and methods, it will be understood by those skilled in the art that various changes in form and detail may be made therein without departing from the spirit and scope of the invention.

I claim:

1. The method of removing burrs from a workpiece comprising the steps of:
    attaching said workpiece to a conductive fixture, said fixture being connected to a source of electric current, said workpiece being the anode in a direct current circuit;
    submerging said workpiece in a tank containing conductive abrasive media immersed in a conductive solution, said solution being an electrolyte solution; and simultaneously:
    passing a direct electric current through said workpiece and said conductive abrasive media and conductive solution, to release atomic oxygen on the burr surface and to form an oxide coating on the surface of the burrs,
    vibrating said tank for providing random contact between said burrs and said conductive abrasive media, thereby wiping off said oxidized burrs.

2. The method of claim 1 including the additional step of:
    discontinuing the electric current when the burrs have been removed from the workpiece, thereby causing said workpiece and said conductive solution to react chemically and form a protective coating on said workpiece.

3. The method of claim 2 wherein the workpiece contains iron and said conductive solution contains phosphoric acid, said solution forming an iron phosphate coating on the workpiece thereby protecting said workpiece during storage.

4. A method of removing burrs from a plurality of electrically conductive components comprising the steps of:
    submerging said components in a tank containing small abrasive conductive media and a conductive solution of phosphoric acid;
    releasing atomic oxygen on the surface of said components by passing an electric current through said components, the abrasive conductive media, and the conductive solution;
    heating the components primarily in the area of the burrs by means of the electric current passing through said components, abrasive conductive media, and electrolyte solution, thereby concentrating the oxidizing action of the atomic oxygen on the burrs, said components being the anode of a direct current circuit;
    repeatedly wiping portions of oxidized burrs from the surface of said components by means of vibrating said tank and thereby causing random contact between said components and said abrasive conductive media;
    whereby the burrs are removed from the electrically conductive components.

5. The method of removing burrs from a workpiece comprising the steps of:
    attaching said workpiece to a conductive fixture, said fixture being connected to a fixed source of electric potential;
    submerging said workpiece in a tank containing random size conductive abrasive media immersed in a conductive solution, said solution being electrolytic, said abrasive media having selected percentages of varying size particles, providing a fixed range of electrical resistivity; and simultaneously;
    passing an electric current through said workpiece and said conductive abrasive media and conductive solution, to release atomic oxygen on the surface of the burrs and to form an oxide coating, said workpiece being the anode in a direct current circuit;
    vibrating said tank for providing random contact between said burrs and said conductive abrasive media, thereby wiping off said oxidized burrs, the electric current in the circuit being regulated by the amplitude and frequency at which said tank is vibrated.

6. The method of removing burrs from a workpiece comprising the steps of:
    attaching said workpiece to a conductive fixture, said fixture being connected to a source of electric current;

submerging said workpiece in a tank containing conductive abrasive media immersed in a conductive solution, said solution being an electrolyte solution; and simultaneously:

passing an alternating electric current through said workpiece and said conductive abrasive media and conductive solution to an electrode submerged in said solution, releasing atomic oxygen on the burr surface to form an oxide coating on the surface of the burrs, vibrating said tank for providing random contact between said burrs and said conductive abrasive media, thereby wiping off said oxidized burrs.

7. The method of claim 6 wherein:

said electrolytic solution is a phosphoric acid solution.

8. The method of claim 7 including the additional step of:

discontinuing the electric current when the burrs have been removed from the workpiece, thereby causing said workpiece and said conductive solution to react chemically and form a protective coating on said workpiece.

9. The method of claim 7 including the additional step of forming iron phosphate on the surface of said workpiece by said workpiece containing iron to react with said phosphoric acid.

References Cited

UNITED STATES PATENTS

| | | | |
|---|---|---|---|
| 1,549,409 | 8/1925 | Gravell | 148—6.15 |
| 2,385,198 | 9/1945 | Engle | 204—143 |
| 2,412,058 | 12/1946 | Pfeil | 204—141 |
| 2,554,701 | 5/1951 | Hackett et al. | 51—7 X |
| 3,409,524 | 11/1968 | Olson | 204—143 |

RALPH S. KENDALL, Primary Examiner

U.S. Cl. X.R.

51—7, 281, 317; 204—143, 273; 219—68